(12) United States Patent
Yang

(10) Patent No.: US 8,385,007 B2
(45) Date of Patent: Feb. 26, 2013

(54) MICRO-LENS MODULE

(75) Inventor: Chuan-Hui Yang, Tainan (TW)

(73) Assignee: Himax Technologies Limited, Tainan (TW)

( * ) Notice: Subject to any disclaimer, the term of this patent is extended or adjusted under 35 U.S.C. 154(b) by 43 days.

(21) Appl. No.: 13/099,596

(22) Filed: May 3, 2011

(65) Prior Publication Data
US 2012/0281300 A1   Nov. 8, 2012

(51) Int. Cl.
*G02B 3/02* (2006.01)
*G02B 9/04* (2006.01)
(52) U.S. Cl. .......................... 359/717; 359/793
(58) Field of Classification Search .................. 359/793, 359/717
See application file for complete search history.

(56) References Cited

U.S. PATENT DOCUMENTS
7,852,573 B2 * 12/2010 Teraoka et al. ............... 359/794

* cited by examiner

*Primary Examiner* — Jack Dinh
(74) *Attorney, Agent, or Firm* — J.C. Patents

(57) ABSTRACT

A micro-lens module including a first lens group and a second lens group is provided. The first lens group is disposed between an object side and an image side, wherein a surface closest to the object side in the first lens group is a first aspheric surface, whose radius of curvature is r1. A surface closest to the image side in the first lens group is a second aspheric surface, whose radius of curvature is r2. The second lens group is disposed between the first lens group and the image side, wherein a surface closest to the first lens group in the second lens group is a third aspheric surface, whose radius of curvature thereof is r3. A surface closest to the image side in the second lens group is a fourth aspheric surface. The micro-lens module satisfies: 0.6>r1>0.4 mm, and 0.3<r1/r2<0.6.

18 Claims, 4 Drawing Sheets

MICRO-LENS MODULE

BACKGROUND OF THE INVENTION

1. Field of the Invention

The invention relates to a lens module, and more particularly to a micro-lens module.

2. Description of Related Art

Along with progress of technology, various portable electronic products such as mobile phones, personal digital assistants (PDAs), notebook computers, tablet computers, etc. are generally equipped with a micro camera lens to facilitate users taking pictures in daily life. With a development trend of continuous improvement in performance and declining in price, the camera function has become a basic function of the portable electronic products.

Generally speaking, a micro-lens module usually provides a good imaging quality and has a miniaturized size to satisfy the market demand. The current micro-lens module in the market has different structure designs in accordance with the requirement of pixels. For example, the current micro-lens module usually includes one to five optical elements and has different structure designs. On the other hand, different manufacturing methods conducted on the lens also result in different structure designs. According to the manufacturing methods, the type of the lens can usually be categorized into an aspheric lens, a spherical glass lens, an aspheric glass lens, and a complex lens. The micro-lens module having the foregoing categorized lenses usually includes independent aperture stops and IR-CUT films based on the structure design of the optical elements. However, in order to obtain a good imaging quality and a miniaturized size, providing a micro-lens module including complex optical elements is necessary.

SUMMARY OF THE INVENTION

The invention is directed to a micro-lens module capable of providing a good imaging quality and having a miniaturized size.

The invention provides a micro-lens module including a first lens group and a second lens group. The first lens group is disposed between an object side and an image side, wherein a surface closest to the object side in the first lens group is a first aspheric surface, whose radius of curvature is r1. A surface closest to the image side in the first lens group is a second aspheric surface, whose radius of curvature is r2. The second lens group is disposed between the first lens group and the image side, wherein a surface closest to the first lens group in the second lens group is a third aspheric surface, whose radius of curvature thereof is r3. A surface closest to the image side in the second lens group is a fourth aspheric surface. The micro-lens module satisfies following conditions: 0.6 millimeter (mm)>r1>0.4 mm, and 0.3<r1/r2<0.6.

In an embodiment of the invention, the first lens group includes a first lens and a second lens arranged in sequence from the object side to the image side. The first lens is closest to the object side in the micro-lens module. A surface of the first lens facing the object side is the first aspheric surface. The second lens is closest to the image side in the first lens group. A surface of the second lens facing the image side is the second aspheric surface.

In an embodiment of the invention, reflective indexes and Abbe Numbers of the first lens and the second lens are respectively Nd and Vd. The first lens and the second lens satisfy following conditions: 1.65>Nd>1.48, and 55>Vd>25.

In an embodiment of the invention, thickness of the first lens and the second lens is respectively d1 and d2. The first lens satisfies a condition of d1<0.16 mm, and the second lens satisfies a condition of 0.025 mm<d2<0.05 mm.

In an embodiment of the invention, the first lens group further includes a transparent flat lens.

In an embodiment of the invention, a reflective index and an Abbe Number of the transparent flat lens are respectively Nd and Vd. The transparent flat lens satisfies following conditions: 1.7>Nd>1.5, and 65>Vd>45.

In an embodiment of the invention, a thickness of the transparent flat lens is d3, and the transparent flat lens satisfies a condition of 0.25 mm<d3<0.4 mm.

In an embodiment of the invention, the first lens group further includes an aperture stop.

In an embodiment of the invention, the aperture stop is disposed on a surface of the transparent flat lens facing the object side.

In an embodiment of the invention, the first lens group further optionally includes an infrared filter.

In an embodiment of the invention, the second lens group includes a third lens and a fourth lens arranged in sequence from the object side to the image side. The third lens is closest to the first lens group in the micro-lens module. A surface of the third lens facing the first lens group is the third aspheric surface. The fourth lens is closest to the image side in the second lens group. A surface of the fourth lens facing the image side is the fourth aspheric surface.

In an embodiment of the invention, reflective indexes and Abbe Numbers of the third lens and the fourth lens are respectively Nd and Vd. The third lens and the fourth lens satisfy following conditions: 1.65>Nd>1.48, and 55>Vd>25.

In an embodiment of the invention, thickness of the third lens and the fourth lens is respectively d4 and d5. The third lens satisfies a condition of 0.025 mm<d4<0.05 mm, and the fourth lens satisfies a condition of 0.2 mm<d5<0.3 mm.

In an embodiment of the invention, the second lens group further includes a transparent flat lens.

In an embodiment of the invention, a reflective index and an Abbe Number of the transparent flat lens are respectively Nd and Vd. The transparent flat lens satisfies following conditions: 1.7>Nd>1.5, and 65>Vd>45.

In an embodiment of the invention, a thickness of the transparent flat lens is d6, and the transparent flat lens satisfies a condition of 0.25 mm<d6<0.4 mm.

In an embodiment of the invention, an effective focal length (EFL) of the first lens group is $f_1$, and the first lens group satisfies a condition of 1 mm<$f_1$<1.6 mm.

In an embodiment of the invention, an EFL of the micro-lens module is f, and an EFL of the first lens group is $f_1$. The micro-lens module satisfies a condition of 0.9<f/$f_1$<1.3.

In an embodiment of the invention, a distance of the second aspheric surface and the third aspheric surface is d7, and 0.25 mm<d7<0.4 mm.

In summary, in the exemplary embodiments of the invention, the first lens group includes the aperture stop and the infrared filter, which are optionally disposed on the lenses or the transparent flat lens in the first lens group to form a complex optical element. Accordingly, in addition to a good image quality, the micro-lens module further has a miniaturized size.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
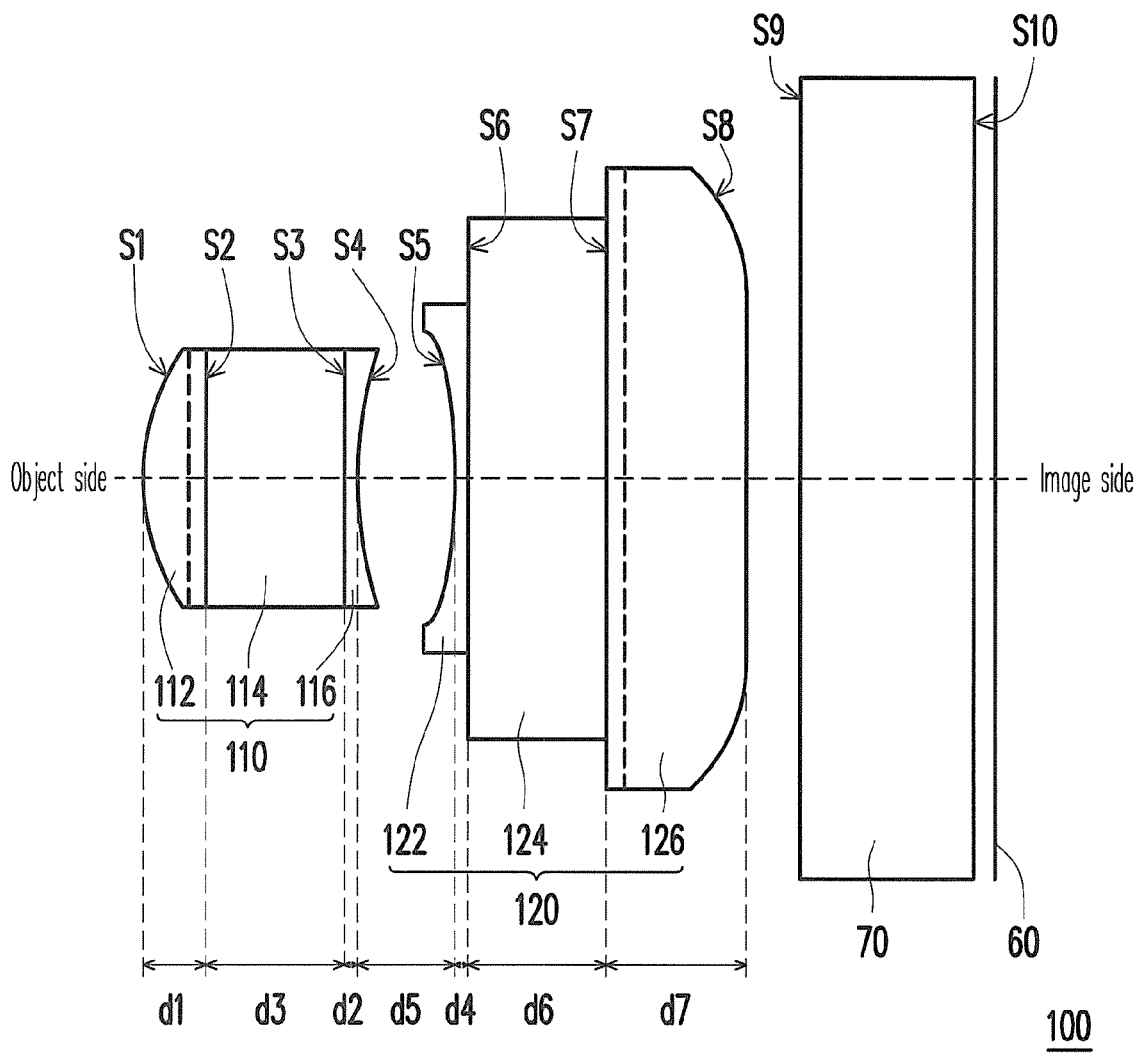
FIG. 1A is a structural schematic diagram of a micro-lens module according to an embodiment of the invention.

FIG. 1A is a structural schematic diagram of a micro-lens module according to an embodiment of the invention. Referring to FIG. 1A, in the present embodiment, the micro-lens module 100 includes a first lens group 110 and a second lens group 120. The first lens group 110 is disposed between an object side and an image side. A surface S1 closest to the image side in the first lens group 110 is a first aspheric surface, whose radius of curvature is r1. A surface S4 closest to the image side in the first lens group 110 is a second aspheric surface, whose radius of curvature is r2. The second lens group 120 is disposed between the first lens group 110 and the image side. A surface S5 closest to the first lens group 110 in the second lens group 120 is a third aspheric surface, whose radius of curvature is r3. A surface S8 closest to the image side in the second lens group 120 is a fourth aspheric surface. In order to ensure optical image quality, the micro-lens module 100 in the present embodiment satisfies following two conditions: 0.6 mm>r1>0.4 mm, and 0.3<r1/r2<0.6.

Furthermore, in the present embodiment, an EFL of the micro-lens module 100 is f, and an EFL of the first lens group 110 is $f_1$. In order to ensure optical image quality, the first lens group 110 satisfies the following condition: 1 mm<$f_1$<1.6 mm, and the micro-lens module 100 satisfies the following condition: 0.9<f/$f_1$<1.3.

To be specific, the first lens group 110 is disposed between the object side and the second lens group 120 and includes a first lens 112, a transparent flat lens 114, and a second lens 116 arranged in sequence from the object side to the image side. Herein, the aperture stop of the present embodiment (not shown), for example, is disposed on a surface of the transparent flat lens 114 facing the object side. In the present embodiment, the first lens group 110 further optionally includes an infrared filter, which is disposed on one of the surfaces of the transparent flat lens 114 in a manner of coating, for example. That is to say, the aperture stop and the infrared filter of the present embodiment are optionally disposed on the lenses or the transparent flat lens 114 in the first lens group 110 to form a complex optical element. Accordingly, in addition to a good image quality, the size of the micro-lens module is further minimized effectively.

In detail, in the present embodiment, the first lens 112 is a plano-convex lens, of which a convex surface S1 faces to the object side, and a plano-surface S2 faces to the image side and is adhered to a plane of the transparent flat lens 114 to form the aperture stop. The second lens 116 is a plano-concave lens, of which a plano-surface S3 faces to the object side and is adhered to a plane of the transparent flat lens 114, and a concave surface S4 faces to the image side. Reflective indexes and Abbe Numbers of the first lens 112, the second lens 116, and the transparent flat lens 114 are respectively Nd and Vd. In order to ensure optical image quality, the first lens 112 and the second lens 116 satisfy following conditions: 1.65>Nd>1.48, and 55>Vd>25. The transparent flat lens 114 satisfies the following condition: 1.7>Nd>1.5, and 65>Vd>45.

Furthermore, thickness of the first lens 112, the second lens 116, and the transparent flat lens 114 are respectively d1, d2, and d3. In order to effectively minimize the size of the micro-lens module, the first lens 112 satisfies the following condition: d1<0.16 mm. The second lens 116 satisfies the following condition: 0.025 mm<d2<0.05 mm. The transparent flat lens 114 satisfies the following condition: 0.25 mm<d3<0.4 mm. Herein, thickness of the lenses or the transparent flat lens refers to a linear distance along the main axis A between two surfaces thereof.

As shown in FIG. 1A, in the present embodiment, the first lens 112 is closest to the object side in the micro-lens module 100. A surface S1 of the first lens 112 facing the object side is the first aspheric surface. The second lens 116 is closest to the image side in the first lens group 110. A surface S4 of the second lens 116 facing the image side is the second aspheric surface.

On the other hand, the second lens group 120 is disposed between the first lens group 110 and the image side and includes a third lens 122, a transparent flat lens 124, and a fourth lens 126 arranged in sequence from the object side to the image side. The third lens 122 is a plano-concave lens, of which a concave surface S5 faces to the object side, and a plano-surface S6 faces to the image side and is adhered to a plane of the transparent flat lens 124. The fourth lens 126 is a plano-convex lens, of which a plano-surface S7 faces to the object side and is adhered to a plane of the transparent flat lens 124, and a convex surface S8 faces to the image side. In the present embodiment, reflective indexes and Abbe Numbers of the third lens 122, the fourth lens 126, and the transparent flat lens 124 are respectively Nd and Vd. In order to ensure optical image quality, the third lens 122 and the fourth lens 126 satisfy following conditions: 1.65>Nd>1.48, and 55>Vd>25. The transparent flat lens 124 satisfies the following condition: 1.7>Nd>1.5, and 65>Vd>45.

Furthermore, thickness of the third lens 122, the fourth lens 126, and the transparent flat lens 124 are respectively d4, d5, and d6. In order to effectively minimize the size of the micro-lens module 100, the third lens 122 satisfies the following condition: 0.025 mm<d4<0.05 mm. The fourth lens 126 satisfies the following condition: 0.2 mm<d5<0.3 mm. The transparent flat lens 124 satisfies the following condition: 0.25 mm<d6<0.4 mm. Herein, thickness of the lenses or the transparent flat lens refers to a linear distance along the main axis A between two surfaces thereof. Furthermore, in the present embodiment, a distance of the second aspheric surface S4 and the third aspheric surface S5 is d7, which satisfies the following condition: 0.25 mm<d7<0.4 mm. Herein, a distance of the two aspheric surfaces refers to a linear distance along the main axis A therebetween.

As shown in FIG. 1A, in the present embodiment, the third lens 122 is closest to the first lens group 110 in the micro-lens module 100. A surface S5 of the third lens 122 facing the first lens group 110 is the third aspheric surface. The fourth lens 126 is closest to the image side in the second lens group 120. A surface S8 of the fourth lens 126 facing the image side is the fourth aspheric surface.

In the present embodiment, the micro-lens module 100 further includes a protection cover 70 disposed between the second lens group 120 and the image side for protecting an image sensor 60 located between a surface S10 and the image side. The protection cover 70 has two surfaces S9 and S10, where the surface S9 faces to the object side, and the surface S10 faces to the image side. In the present embodiment, a material of the protection cover 70 is a transparent material, for example, glass, or transparent resins, etc., and the image sensor 60 can be a charge coupled device (CCD), or a complementary metal-oxide-semiconductor (CMOS) sensor, etc.

An embodiment of the micro-lens module 100 is provided below. It should be noticed that data listed in following table 1 and table 2 are not used to limit the invention, and those skilled in the art can suitably change the parameters or settings therein without departing from the scope of the invention.

In Table 1, the distance refers to a linear distance along the main axis A between two neighboring surfaces. For example, the distance of Surface S3 is the linear distance along the main axis A between Surface S3 and Surface S4. The distance, index of refraction, and Abbe number corresponding to each of the lenses listed in the "Notes" column can be found in the corresponding values for the distance, index of refraction, and Abbe number from each row. Moreover, in Table 1, surfaces S1 and S2 are two surfaces of the first lens 112, surfaces S3 and S4 are two surfaces of the second lens 116, surfaces S5 and S6 are two surfaces of the third lens 122, surfaces S7 and S8 are two surfaces of the fourth lens 126, and the surfaces S9 and S10 are two surfaces of the protection cover 70, where a value filled in the space field in the row of the surface S10 is a distance between the surface S8 and the image sensor 60.

The radius of curvature, the distance, and other parameters are shown in Table 1, so they are not further described herein.

The above surfaces S1, S4, S5, and S8 are aspheric surfaces with even power, and are expressed by the following formula:

$$Z = \frac{cr^2}{1 + \sqrt{1 - (1+k)c^2 r^2}} + \alpha_1 r^2 +$$

$$\alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the formula, Z is a sag in the direction of the optical axis A, and c is the inverse of the radius of an osculating sphere, i.e. the inverse of the radius of curvature (e.g., the radius of curvatures of Surfaces S1, S4, S5, and S in the Table 1) close to the optical axis A. k is a conic coefficient, r is a height of an aspheric surface, i.e. a height from a center to an edge of a lens, and $\alpha_1$-$\alpha_8$ are aspheric coefficients, and in the present embodiment, the coefficient $\alpha_1$ is 0. Parameters of the surfaces S1, S4, S5 and S8 are listed in a Table 2.

TABLE 1

| Surface | Radius of Curvature (mm) | Distance (mm) | Index of Refraction | Abbe Number | Notes |
|---|---|---|---|---|---|
| S1 | 0.4792087 | 0.135 | 1.52 | 48.711 | first lens |
| S2 | infinity | 0.3 | 1.51 | 61.614 | transparent flat lens |
| S3 | infinity | 0.03 | 1.52 | 48.711 | second lens |
| S4 | 1.225944 | 0.207594 | | | |
| S5 | −2.402625 | 0.03 | 1.52 | 48.711 | third lens |
| S6 | infinity | 0.3 | 1.51 | 61.614 | transparent flat lens |
| S7 | infinity | 0.302 | 1.52 | 48.711 | fourth lens |
| S8 | 7.817823 | 0.115652 | | | |
| S9 | infinity | 0.38 | 1.519 | 64.875 | protection cover |
| S10 | infinity | 0.025 | | | |

TABLE 2

| Aspheric Surface Parameter | 2nd order conic constant k | Coefficient $\alpha_2$ | Coefficient $\alpha_3$ | Coefficient $\alpha_4$ |
|---|---|---|---|---|
| S1 | −21.1568 | 17.35588 | −335.06644 | 4674.8458 |
| S4 | 11.02326 | 0.07634673 | −9.3853115 | 482.35541 |
| S5 | 0 | −2.6700512 | −10.762533 | 490.36406 |
| S8 | 0 | −0.4685337 | 0.33931121 | −1.2672644 |

| Aspheric Surface Parameter | Coefficient $\alpha_5$ | Coefficient $\alpha_6$ | Coefficient $\alpha_7$ | Coefficient $\alpha_8$ |
|---|---|---|---|---|
| S1 | −24877.173 | −250047.89 | 4246116.2 | −16811132 |
| S4 | −9249.0774 | 55891.681 | 411591.02 | −4451492.1 |
| S5 | −10875.2 | 40700.291 | 668866.93 | −5483350.1 |
| S8 | −7.844273 | 25.160946 | −23.810649 | −0.1955645 |

Figure 1B:
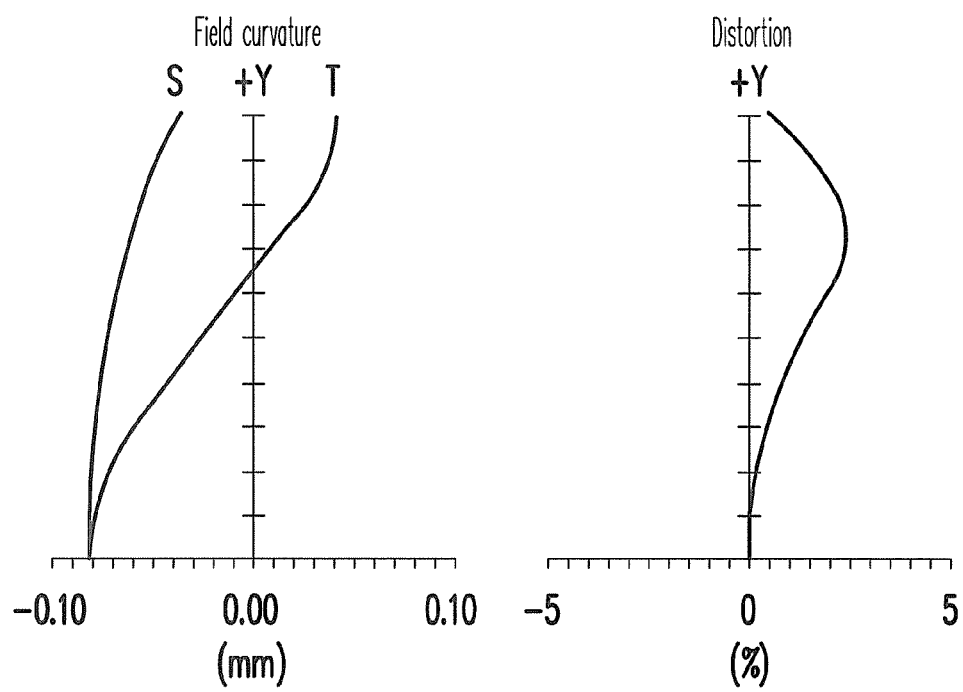
FIG. 1B and FIG. 1C are imaging optical simulation data diagrams of the micro-lens module of FIG. 1A.
Figure 1C:
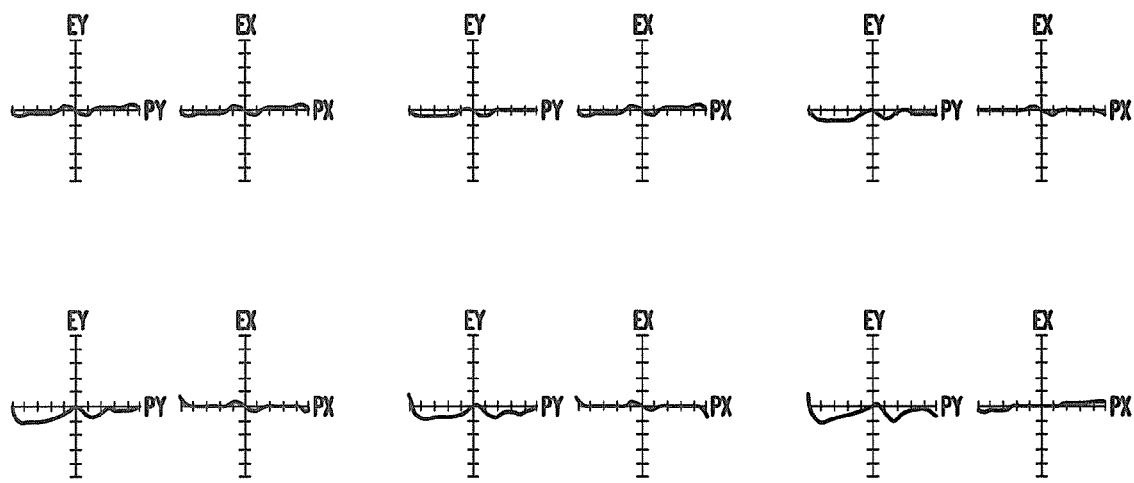

FIG. 1B and FIG. 1C are imaging optical simulation data diagrams of the micro-lens module 100 of FIG. 1A. Referring to FIG. 1B, a field curvature diagram and a distortion diagram are respectively illustrated from the left to the right. Moreover, FIG. 1C is a transverse ray fan plot of images. According to FIG. 1B and FIG. 1C, it is known that the micro-lens module 100 of the present embodiment may have a good imaging quality while maintaining a miniaturized size.

Figure 2A:
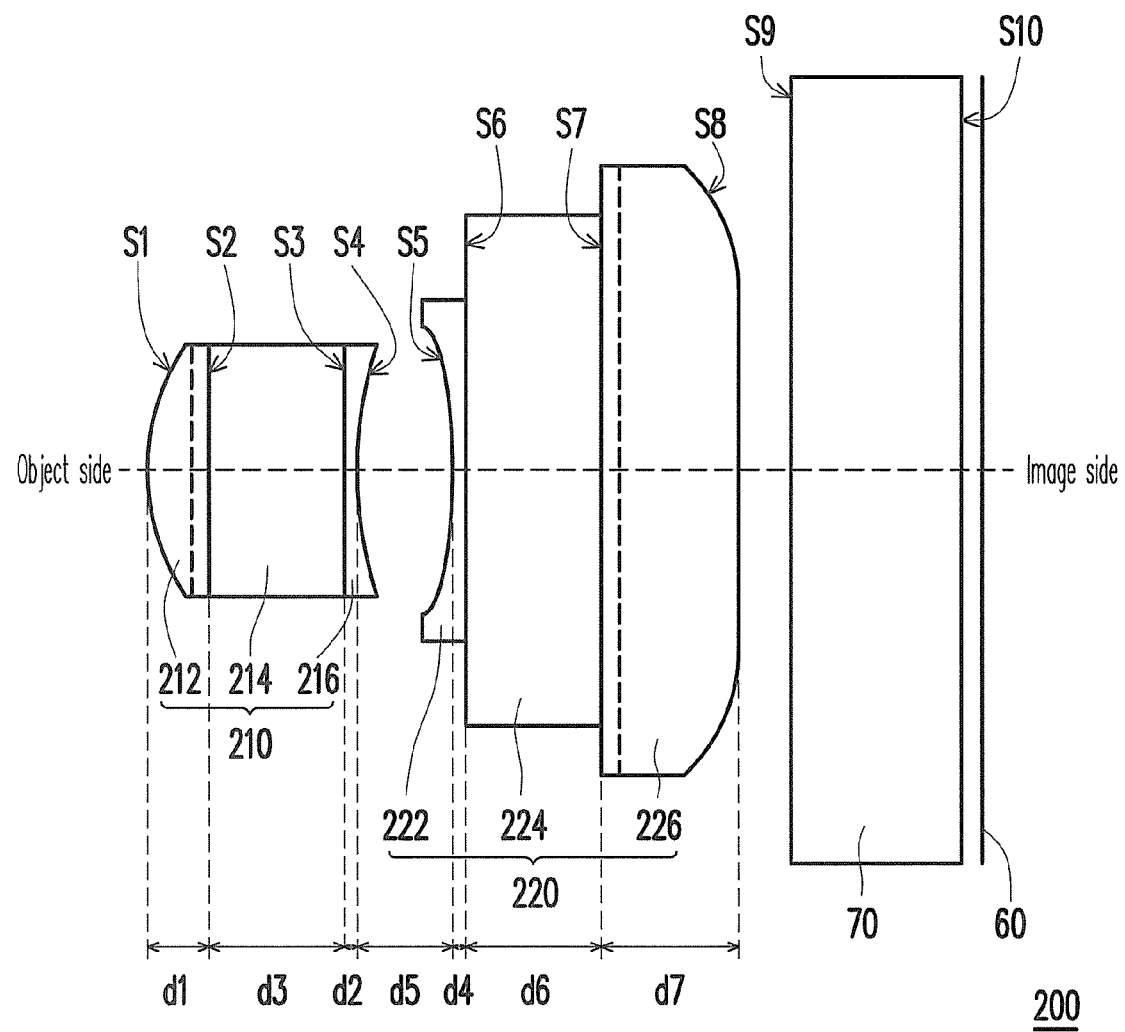
FIG. 2A is a structural schematic diagram of a micro-lens module according to another embodiment of the invention.

FIG. 2A is a structural schematic diagram of a micro-lens module 200 according to another embodiment of the invention. Referring to FIG. 2A, the micro-lens module 200 of the present embodiment is similar to the micro-lens module 100 of FIG. 1A, and the differences there between are described below.

In detail, in the present embodiment, the micro-lens module 200 includes a first lens group 210 and a second lens group 220. The first lens group 210 is disposed between an object side and an image side. A surface S1 closest to the image side in the first lens group 210 is a first aspheric surface, whose radius of curvature is r1. A surface S4 closest to the image side in the first lens group 210 is a second aspheric surface, whose radius of curvature is r2. The second lens group 220 is disposed between the first lens group 210 and the image side. A surface S5 closest to the first lens group 210 in the second lens group 220 is a third aspheric surface, whose radius of curvature is r3. A surface S8 closest to the image side in the second lens group 220 is a fourth aspheric surface. In order to ensure optical image quality, the micro-lens module 200 in the present embodiment satisfies following two conditions: 0.6 mm>r1>0.4 mm, and 0.3<r1/r2<0.6.

As shown in FIG. 2A, in the present embodiment, the first lens 212 is closest to the object side in the micro-lens module 200. A surface S1 of the first lens 212 facing the object side is the first aspheric surface. The second lens 216 is closest to the image side in the first lens group 210. A surface S4 of the second lens 216 facing the image side is the second aspheric surface. The third lens 222 is closest to the first lens group 210 in the micro-lens module 200. A surface S5 of the third lens 222 facing the first lens group 210 is the third aspheric surface. The fourth lens 226 is closest to the image side in the second lens group 220. A surface S8 of the fourth lens 126 facing the image side is the fourth aspheric surface.

An embodiment of the micro-lens module 200 is provided below. It should be noticed that data listed in following table 3 and table 4 are not used to limit the invention, and those skilled in the art can suitably change the parameters or settings therein without departing from the scope of the invention.

TABLE 3

| Surface | Radius of Curvature (mm) | Distance (mm) | Index of Refraction | Abbe Number | Notes |
| --- | --- | --- | --- | --- | --- |
| S1 | 0.582 | 0.19 | 1.6 | 28.71774 | first lens |
| S2 | infinity | 0.35 | 1.51 | 61.61409 | transparent flat lens |
| S3 | infinity | 0.03 | 1.6 | 28.71774 | second lens |
| S4 | 1.0769 | 0.135 | | | |
| S5 | 18.443 | 0.03 | 1.6 | 28.71774 | third lens |
| S6 | infinity | 0.35 | 1.51 | 61.61409 | transparent flat lens |
| S7 | infinity | 0.287 | 1.6 | 28.71774 | fourth lens |
| S8 | 13.508 | 0.14 | | | |
| S9 | infinity | 0.38 | 1.518 | 65.05429 | protection cover |
| S10 | infinity | 0.025 | | | |

In Table 3, the distance refers to a linear distance along the main axis A between two neighboring surfaces. For example, the distance of Surface S3 is the linear distance along the main axis A between Surface S3 and Surface S4. The distance, index of refraction, and Abbe number corresponding to each of the lenses listed in the "Notes" column can be found in the corresponding values for the distance, index of refraction, and Abbe number from each row. Moreover, in Table 3, surfaces S1 and S2 are two surfaces of the first lens 212, surfaces S3 and S4 are two surfaces of the second lens 216, surfaces S5 and S6 are two surfaces of the third lens 222, surfaces S7 and S8 are two surfaces of the fourth lens 226, and the surfaces S9 and S10 are two surfaces of the protection cover 70, where a value filled in the space field in the row of the surface S10 is a distance between the surface S8 and the image sensor 60.

The numeral values of the parameters such as the radius of curvature and the distance of each surface are given in Table 3, and will not be repeated herein again.

The above surfaces S1, S4, S5, and S8 are aspheric surfaces with even power, and are expressed by the following formula:

$$Z = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the formula, Z is a sag in the direction of the optical axis A, and c is the inverse of the radius of an osculating sphere, i.e. the inverse of the radius of curvature (e.g., the radius of curvatures of Surfaces S1, S4, S5, and S8 in the Table 3) close to the optical axis A. k is a conic coefficient, r is a height of an aspheric surface, i.e. a height from a center to an edge of a lens, and $\alpha_1$-$\alpha_8$ are aspheric coefficients, and in the present embodiment, the coefficient $\alpha_1$ is 0. Parameters of the surfaces S1, S4, S5 and S8 are listed in a Table 4.

TABLE 4

| Aspheric Surface Parameter | 2nd order conic constant k | Coefficient $\alpha_2$ | Coefficient $\alpha_3$ | Coefficient $\alpha_4$ |
|---|---|---|---|---|
| S1 | −33.2054 | 13.781097 | −267.64343 | 3606.7456 |
| S4 | −22.919 | 1.098778 | 48.820729 | −1109.5538 |
| S5 | 0 | 0.14350126 | −94.201136 | 3154.4947 |
| S8 | 0 | −0.0658990 | −0.5448229 | −1.7673738 |

| Aspheric Surface Parameter | Coefficient $\alpha_5$ | Coefficient $\alpha_6$ | Coefficient $\alpha_7$ | Coefficient $\alpha_8$ |
|---|---|---|---|---|
| S1 | −16975.777 | −221169.4 | 3318861.3 | −12498261 |
| S4 | 3518.5051 | 219853.6 | −3158354.3 | 13332453 |
| S5 | −64739.23 | 751635.48 | −4562309.4 | 11136760 |
| S8 | 8.7451921 | −17.309237 | 11.285346 | −0.1633849 |

Figure 2B:
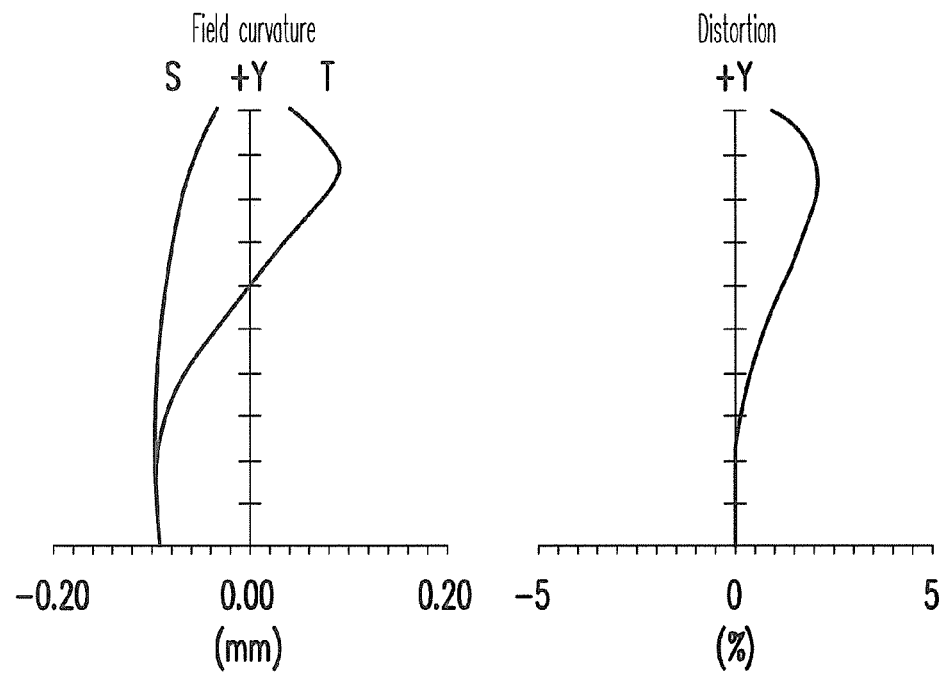
FIG. 2B and FIG. 2C are imaging optical simulation data diagrams of the micro-lens module of FIG. 2A.
Figure 2C:
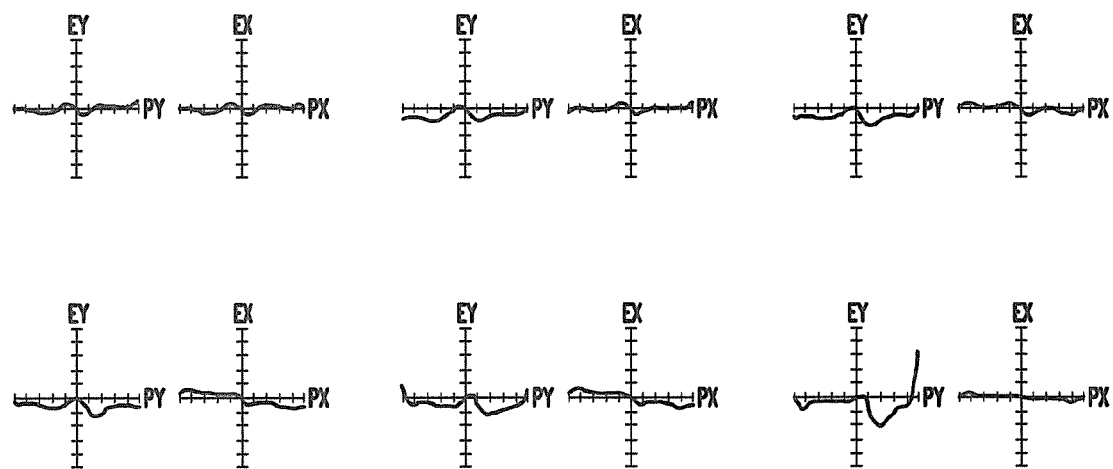

FIG. 2B and FIG. 2C are imaging optical simulation data diagrams of the micro-lens module 200 of FIG. 2A. Referring to FIG. 2B, a field curvature diagram and a distortion diagram are respectively illustrated from the left to the right. Moreover, FIG. 2C is a transverse ray fan plot of images. According to FIG. 2B and FIG. 2C, it is known that the micro-lens module 200 of the present embodiment may have a good imaging quality while maintaining a miniaturized size.

In summary, in the exemplary embodiments of the invention, the first lens group includes the aperture stop and the infrared filter, which are optionally disposed on the lenses or the transparent flat lens in the first lens group to form a complex optical element. Accordingly, in addition to a good image quality, the micro-lens module further has a miniaturized size.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A micro-lens module, comprising:
a first lens group disposed between an object side and an image side, wherein a surface closest to the object side in the first lens group is a first aspheric surface, a radius of curvature thereof is r1, a surface closest to the image side in the first lens group is a second aspheric surface, and a radius of curvature thereof is r2; and
a second lens group disposed between the first lens group and the image side, wherein a surface closest to the first lens group in the second lens group is a third aspheric surface, a radius of curvature thereof is r3, and a surface closest to the image side in the second lens group is a fourth aspheric surface,
wherein the micro-lens module satisfies following conditions: 0.6 millimeter(mm)>r1 >0.4 mm, and 0.3<r1/r2<0.6.
wherein the first lens group comprises a first lens and a second lens arranged in sequence from the object side to the image side, the first lens is closest to the object side in the micro-lens module, a surface of the first lens facing the object side is the first aspheric surface, the second lens is closest to the image side in the first lens group, and a surface of the second lens facing the image side is the second aspheric surface.

2. The micro-lens module as claimed in claim 1, wherein reflective indexes and Abbe Numbers of the first lens and the second lens are respectively Nd and Vd, and the first lens and the second lens satisfy following conditions: 1.65>Nd>1.48, and 55>Vd>25.

3. The micro-lens module as claimed in claim 1, wherein thickness of the first lens and the second lens is respectively d1 and d2, the first lens satisfies a condition of d1<0.16 mm, and the second lens satisfies a condition of 0.025 mm <d2 <0.05 mm.

4. The micro-lens module as claimed in claim 1, wherein the first lens group further comprises a transparent flat lens.

5. The micro-lens module as claimed in claim 4, wherein a reflective index and an Abbe Number of the transparent flat lens are respectively Nd and Vd, and the transparent flat lens satisfies following conditions: 1.7>Nd>1.5, and 65>Vd>45.

6. The micro-lens module as claimed in claim 4, wherein a thickness of the transparent flat lens is d3, and the transparent flat lens satisfies a condition of 0.25 mm <d3 <0.4 mm.

7. The micro-lens module as claimed in claim 4, wherein the first lens group further comprises an aperture stop.

8. The micro-lens module as claimed in claim 7, wherein the aperture stop is disposed on a surface of the transparent flat lens facing the object side.

9. The micro-lens module as claimed in claim 1, wherein the first lens group further optionally comprises an infrared filter.

10. The micro-lens module as claimed in claim 1, wherein the second lens group comprises a third lens and a fourth lens arranged in sequence from the object side to the image side, the third lens is closest to the first lens group in the micro-lens module, a surface of the third lens facing the first lens group is the third aspheric surface, the fourth lens is closest to the image side in the second lens group, and a surface of the fourth lens facing the image side is the fourth aspheric surface.

11. The micro-lens module as claimed in claim 10, wherein reflective indexes and Abbe Numbers of the third lens and the fourth lens are respectively Nd and Vd, and the third lens and the fourth lens satisfy following conditions: 1.65>Nd>1.48, and 55>Vd>25.

12. The micro-lens module as claimed in claim 10, wherein thickness of the third lens and the fourth lens is respectively d4 and d5, the third lens satisfies a condition of 0.025 mm<d4 <0.05 mm, and the fourth lens satisfies a condition of 0.2mm<d5 <0.3 mm.

13. The micro-lens module as claimed in claim 10, wherein the second lens group further comprises a transparent flat lens.

14. The micro-lens module as claimed in claim 13, wherein a reflective index and an Abbe Number of the transparent flat lens are respectively Nd and Vd, and the transparent flat lens satisfies following conditions: 1.7>Nd>1.5, and 65>Vd>45.

15. The micro-lens module as claimed in claim 13, wherein a thickness of the transparent flat lens is d6, and the transparent flat lens satisfies a condition of 0.25 mm<d6 <0.4 mm.

16. The micro-lens module as claimed in claim 1, wherein an effective focal length (EFL) of the first lens group $f_1$, and the first lens group satisfies a condition of 1 mm <$f_1$ <1.6 mm.

17. The micro-lens module as claimed in claim 1, wherein an EFL of the micro-lens module is f, an EFL of the first lens group is $f_1$, and the micro-lens module satisfies a condition of 0.9<f/$f_1$<1.3.

18. The micro-lens module as claimed in claim 1, wherein a distance of the second aspheric surface and the third aspheric surface is d7, and 0.25 mm <d7 <0.4 mm.

\* \* \* \* \*